United States Patent Office 3,766,063
Patented Oct. 16, 1973

3,766,063
BACTERICIDAL MIXTURE OF SULFITE SALT AND SURFACTANT QUATERNARY AMMONIUM SALT
Charles F. Blankenhorn, La Habra, Calif., and Ted S. Felmann, Phoenix, Ariz., assignors to Shell Oil Company, New York, N.Y.
No Drawing. Filed July 19, 1971, Ser. No. 164,049
Int. Cl. E21b 43/22; A61l 13/00
U.S. Cl. 252—8.55 D
2 Claims

ABSTRACT OF THE DISCLOSURE

The growth of bacteria in an aqueous liquid is inhibited by dissolving in the aqueous liquid an effective amount of a mixture of a soluble sulfite salt and a surface active quaternary ammonium salt.

BACKGROUND OF THE INVENTION

This invention relates to treating water which is or is apt to be contaminated with bacteria. The invention is particularly useful in treating an aqueous liquid used in a fluid drive oil recovery process.

Fluid drive oil recovery processes which use an aqueous liquid are commonly referred to as waterflood operations and are commonly faced with a problem in the control of both aerobic bacteria and anaerobic bacteria in the waters or aqueous liquids utilized for injection. The presence of anaerobic bacteria, such as the sulfate-reducing bacteria, is of primary concern, because of the metal corrosion, formation plugging, and possible hydrogen sulfide toxic effects which are the result of the end products of this organism's metabolism. The conditions existing in a waterflood oil recovery operation provide a stimulating environment for the growth of bacteria. When once inoculated into the systems, the organisms are offered all of the benefits of a dynamic state of continuous cultivation. This is especially true for the anaerobic sulfate-reducing bacteria, since the system is usually made anaerobic at some point in the water treatment plant. The flow of water through the plant and reservoir system assures continuous replenishment of nutrients for the bacteria and concomitant removal of any toxic waste products as well as their accompanying unfavorable reduction in the pH of the aqueous liquid.

Many variations of continuous and slug type injection programs for introducing bactericidal materials have been utilized in attempts to control bacterial growth. Aqueous solutions of acrolein and/or other olefinically unsaturated lower aldehydes, such as those described in the M. Legator patent, 2,987,475, are commonly used for the control of bacteria. In some situations, however, the use of acrolein has necessitated the use of other chemicals in order to reduce the operating hazards due to its toxicity, lacrimatory properties, tendency to undergo spontaneous polymerization, and the like. Various less volatile carbonyl compounds, such as malealdehyde, 1-chloro-2-propane, crotonaldehyde, cinnamaldehyde, 2-chloroacetophenone, furfural, mesityl oxide, etc., have certain advantages in respect to having lower vapor pressures, flash points, and less tendency to polymerize exothermically. However, the less volatile compounds tend to be less effective than the more volatile carbonyls, although they are generally more effective than surfactant types of bactericidal materials.

In a waterflood oil recovery process it is often desirable to dissolve a water soluble sulfite, such as sodium sulfite, and/or a hydrosulfite in the flood water to remove or "scavenge" oxygen to prevent oxidative corrosion. Reactive aldehyde or ketone carbonyl compounds that tend to be effective bactericides are capable of rapid addition reactions with sulfites. The carbonyl-sulfite addition products are water insoluble and, thus, the presence of sulfite interferes with the bactericidal effectiveness of a carbonyl compound.

SUMMARY OF THE INVENTION

In accordance with the present invention, bacteria in an aqueous liquid are killed and/or kept from growing by incorporating in the aqueous liquid a synergistic mixture of soluble sulfite salt and surface active quaternary ammonium salt.

The present invention is at least in part premised on a discovery that the bactericidal effectiveness of a surfactant quaternary ammonium salt is enhanced by the formation of a combination product between the quaternary ammonium component and the sulfite. Such an enhanced activity has been observed with respect to both aerobic and anaerobic bacteria.

Laboratory tests have shown that a reaction occurs between a surface active quaternary ammonium compound and a sulfite, such as sodium sulfite, in an aqueous medium. Tests indicate that such reactions yield sodium chloride and a material analogous to a quaternary ammonium sulfite anion. This reaction is evidence by a reduction in the surface activity of the surfactant. In such tests a reaction between two moles of a 50% aqueous solution of an alkyldimethylbenzylammonium chloride (in which the alkyl group contained 40% $C_{12}$, 50% $C_{14}$, and 10% $C_{16}$ alkyl groups) with two moles of sodium sulfite yielded two liquid phases consisting of a chloride-by-sulfite-replacement phase and an aqueous phase containing dissolved sodium chloride. A similar reaction of two moles of Redicote E–11 with two moles of sodium sulfite yielded only one liquid phase (probably because the active ingredient of the Redicote is present as a 50% solution in alcohol), and precipitated sodium chloride.

DESCRIPTION OF THE INVENTION

The quaternary ammonium salt surfactants used in the present invention can comprise substantially any such ammonium salts of relatively long chain mono or polyamines having properties typified by those of the hydrochloric acid salts of quaternary diamines such as Armour's Redicote E–11, the alkyldimethylbenzylammonium chlorides in which the alkyl group is composed of about 40% $C_{12}$, 50% $C_{14}$ and 10% $C_{16}$ alkyl groups, etc.

Where the flood water contains oxygen, an oxygen-scavenging proportion of water soluble sulfite salt, such as an equivalent of about 9 p.p.m. sodium sulfite per each p.p.m. of oxygen, should be added to react with the oxygen. The present bactericidal mixture of sulfite salt and quaternary ammonium compound is preferably used in a proportion of at least about 10 p.p.m. In the bactericidal mixture the ratio of sulfite salt to quaternary salt is preferably substantially stoichiometric but can contain up to about a 20% excess or shortage of either component. In general the use of at least some excess of quaternary ammonium salt, relative to the amount of sulfite not used in reacting with oxygen, is preferred.

The present bactericides are adapted to kill bacteria when used in relatively high concentrations and to inhibit their growth when used in lower proportions. The killing is effected by the concentration plus the time of contact between the bactericide and the bacteria. Bacteria treated with concentrations which produce inhibition without kill may be reviewed by a simple dilution of the system. In a preferred procedure, the chemical treatment program can avoid a continuous injection of a chemical at a relatively low concentration by using pulsed treatments at higher concentrations with a frequency such that the overall amount of chemical per day or similar unit is sufficient to accomplish the inhibition. The concentration and frequency of the pulsed injections should be correlated with the generation time of the bacteria and volume and rate of flow of the water so that sufficient treatment time and contact area exists. The generation time of bacteria refers to the time required for the bacterial population to double.

The present bactericides can be injected into substantially any aqueous liquid being used in a waterflood oil production process with little or no modification of the existing injection equipment. These bactericides can be used in conjunction with substantially any of the aqueous sulfite and/or hydrosulfite oxygen scavenging procedures and equipment. The surfactant quaternary ammonium and sulfite salts are each preferably injected into the batch or stream of the aqueous liquid in proportions or rates adjusted to provide the selected ratio of surfactant to carbonyl material and concentration of bactericide within the aqueous liquid.

Examples

*Desulfovibrio desulfuricans* were cultivated in a medium which uses lactate as a carbon source. As indicated in the following tables, the specified types of aqueous liquids and dry media bottles were inoculated. The effectiveness of the specified bactericides at concentrations ranging from 10 to 40 parts per million are indicated with respect to the total amount of bacteria per milliliter of aqueous liquid, or the number of days required for blackening of dry media bottles due to the production of black covered sulfite precipitates are indicated in the tables. The cultivating, inoculating, counting, etc., procedures utilized conventional laboratory techniques and equipment.

TABLE I

Water: Cook inlet
Salinity: 22,200 p.p.m.
H₂S: None
Treatment time: 3 hours

| Chemical | Concentration (p.p.m.) | Total bacteria/ml. | Dry media bottles [1] No sulfite | 30 p.p.m. sulfite | API anaerobic method [2] |
|---|---|---|---|---|---|
| Aqualin | 10 | 600 | 5 | 2 | — |
| Do | 20 | 75 | X | 2 | — |
| Do | 40 | 0 | X | X | — |
| Aqualin and Amour E-11 [3] | 10 | 550 | 3 | 3 | — |
| Do | 20 | 5 | 7 | 5 | — |
| Do | 40 | 0 | X | X | — |
| 1,2,4-trichlorobenzene and Armour E-11 [3] | 10 | 800 | 2 | 2 | — |
| Do | 20 | 550 | 3 | 3 | + |
| Do | 40 | 80 | 4 | 3 | + |
| Armour E-11 | 10 | 1,100 | 2 | 2 | + |
| Do | 20 | 700 | 2 | 2 | + |
| Do | 40 | 680 | 2 | 2 | + |
| Dowell A-9 | 10 | 15,400 | 4 | 4 | + |
| Do | 20 | 15,000 | 8 | 4 | + |
| Do | 40 | 15,000 | 15 | X | + |
| Sodium arsenite | 10 | 85,000 | 8 | 4 | + |
| Do | 20 | 15,000 | 13 | 4 | + |
| Do | 40 | 15,000 | 13 | 14 | + |
| Cinnamaldehyde | 10 | 21,000 | 2 | 2 | + |
| Do | 20 | 21,000 | 2 | 2 | + |
| Do | 40 | 21,000 | 3 | 2 | + |
| Methyl chloroformate | 10 | 4,000 | 2 | 2 | + |
| Do | 20 | 650 | 2 | 2 | + |
| Do | 40 | 60 | 2 | 2 | + |
| 1-chloro-2-propanone | 10 | 45,000 | 5 | 2 | + |
| Do | 20 | 41,000 | X | 2 | + |
| Do | 40 | 20,000 | X | 2 | + |
| Control (untreated water) | | 95,000 | 1 | 1 | + |
| Blank (media alone) | | 0 | | | — |

[1] Days required for blackening; "X" indicates no blackening at end of 30 days.
[2] "+" indicates growth and balckening; "—" indicates no growth within 30 days.
[3] The concentrations shown represent a 50/50 ratio of each chemical.

TABLE II

Water: Blend water
Salinity: 4,900 p.p.m.
H₂S: None
Treatment time: 3 hours

| Chemical | Concentration (p.p.m.) | Total bacteria/ml. | Dry media bottles [1] No sulfite | 30 p.p.m. sulfite | API anaerobic method [2] No sulfite | 30 p.p.m. sulfite |
|---|---|---|---|---|---|---|
| Aqualin | 10 | 12,000 | 7 | 2 | + | + |
| Do | 20 | 200 | X | 5 | — | + |
| Do | 40 | 0 | X | X | — | — |
| Aqualin and Armour E-11 [3] | 10 | 110,000 | 6 | 5 | — | + |
| Do | 20 | 275 | 7 | 7 | — | — |
| Do | 40 | 0 | X | X | — | — |
| 1,2,4-trichlorobenzene and Armour E-11 [3] | 10 | 190,000 | 5 | 5 | + | + |
| Do | 20 | 40,000 | X | X | — | — |
| Do | 40 | 3,000 | X | X | — | — |
| 1-chloro-2-propanone | 10 | 120,000 | 5 | 2 | + | + |
| Do | 20 | 40,000 | 18 | 2 | + | + |
| Do | 40 | 30,000 | X | 2 | + | + |
| 1-chloro-2-propanone and Armour E-11 [3] | 10 | 180,000 | 5 | 4 | + | + |
| Do | 20 | 18,000 | X | 6 | + | + |
| Do | 40 | 15,000 | X | 25 | — | |
| Cinnamaldehyde | 10 | >200,000 | 3 | 1 | + | + |
| Do | 20 | >200,000 | 4 | 1 | + | + |
| Do | 40 | >200,000 | 4 | 1 | + | + |
| Cinnamaldehyde and Armour E-11 [3] | 10 | >200,000 | 4 | 4 | + | + |
| Do | 20 | 40,000 | 6 | 6 | + | |
| Do | 40 | 1,000 | X | X | | |
| Allyl alcohol | 10 | >200,000 | 4 | 2 | + | + |
| Do | 20 | >200,000 | 4 | 2 | + | + |
| Do | 40 | >200,000 | 4 | 2 | + | + |
| Allyl chloride | 10 | >200,000 | 3 | 1 | + | + |

TABLE II—Continued

| Chemical | Concentration (p.p.m.) | Total bacteria/ml. | Dry media bottles[1] No sulfite | Dry media bottles[1] 30 p.p.m. sulfite | API anaerobic method[2] No sulfite | API anaerobic method[2] 30 p.p.m. sulfite |
|---|---|---|---|---|---|---|
| Do | 20 | >200,000 | 4 | 1 | + | + |
| Do | 40 | >200,000 | 4 | 1 | + | + |
| 3-chloro-2-methylpropene | 10 | >200,000 | 3 | 2 | + | + |
| Do | 20 | >200,000 | 3 | 3 | + | + |
| Do | 40 | >200,000 | 3 | 3 | + | + |
| Sodium arsenite | 10 | >200,000 | 4 | 2 | + | + |
| Do | 20 | >200,000 | 6 | 3 | + | + |
| Do | 40 | >200,000 | 6 | 5 | + | + |
| Dowell A-9 | 10 | >200,000 | 5 | 2 | + | + |
| Do | 20 | >200,000 | 6 | 3 | + | + |
| Do | 40 | >200,000 | 6 | X | + | + |
| PVP-iodine | 10 | >200,000 | 4 | 2 | + | + |
| Do | 20 | >200,000 | 4 | 2 | + | + |
| Do | 40 | >200,000 | 4 | 4 | + | + |
| Trichloroacetic acid | 10 | >200,000 | 4 | 1 | + | + |
| Do | 20 | >200,000 | 4 | 1 | + | + |
| Do | 40 | >200,000 | 4 | 1 | + | + |
| Mesityl oxide | 10 | >200,000 | 4 | 2 | + | + |
| Do | 20 | >200,000 | 4 | 2 | + | + |
| Do | 40 | >200,000 | 4 | 2 | + | + |
| Control (untreated water) | | 480,000 | 1 | 1 | + | + |
| Blank (media alone) | | 0 | | | – | – |

[1] Days required for blackening; "X" indicates no blackening at end of 30 days.
[2] "+" indicates growth and blackening; "---" indicates growth of light-colored colonies of desulfovibrio; "–" indicates no growth within 30 days.
[3] The concentrations shown represent a 50/50 ratio of each chemical.

TABLE III

Water: Blend water
Salinity: 4,380 p.p.m.
H₂S: None
Treatment time: 3 hours

| Chemical | Concentration (p.p.m.) | Dry media bottles[1] No sulfite | Dry media bottles[1] 30 p.p.m. sulfite |
|---|---|---|---|
| Aqualin | 10 | 4 | Not run. |
| Do | 20 | 9 | Do. |
| Do | 40 | X | Do. |
| Aqualin and Armour E-11[2] | 10 | 5 | Do. |
| Do | 20 | 9 | Do. |
| Do | 40 | X | Do. |
| Armour E-11 | 10 | 4 | Do. |
| Do | 20 | 4 | Do. |
| Do | 40 | 5 | Do. |
| Mesityl oxide | 10 | 5 | Do. |
| Do | 20 | 5 | Do. |
| Do | 40 | 5 | Do. |
| Mesityl oxide and Armour E-11[2] | 10 | 5 | Do. |
| Do | 20 | 6 | Do. |
| Do | 40 | 6 | Do. |
| Butyraldehyde | 10 | 3 | 1. |
| Do | 20 | 3 | 1. |
| Do | 40 | 5 | 1. |
| Butyraldehyde and Armour E-11[2] | 10 | 4 | Not run. |
| Do | 20 | 5 | Do. |
| Do | 40 | 5 | Do. |
| Furfural | 10 | 5 | 1. |
| Do | 20 | 5 | 1. |
| Do | 40 | 5 | 1. |
| Furfural and Armour E-11[2] | 10 | 5 | Not run. |
| Do | 20 | 6 | Do. |
| Do | 40 | 6 | Do. |
| Cyclohexanone | 10 | 5 | 1. |
| Do | 20 | 5 | 1. |
| Do | 40 | 5 | 1. |
| Cyclohexanone and Armour E-11[2] | 10 | 3 | Not run. |
| Do | 20 | 5 | Do. |
| Do | 40 | 6 | Do. |
| Benzaldehyde | 10 | 3 | 1. |
| Do | 20 | 3 | 1. |
| Do | 40 | 3 | 1. |
| Benzaldehyde and Armour E-11[2] | 10 | 3 | Not run. |
| Do | 20 | 5 | Do. |
| Do | 40 | 5 | Do. |
| Acetophenone | 10 | 3 | 1. |
| Do | 20 | 3 | 1. |
| Do | 40 | 3 | 1. |
| Acetophenone and Armour E-11[2] | 10 | 3 | Not run. |
| Do | 20 | 4 | Do. |
| Do | 40 | 4 | Do. |
| Control (untreated water) | | 2 | 1. |

[1] Days required for blackening; "X" indicates no blackening at end of 30 days.
[2] The concentrations shown represent a 50/50 ratio of each chemical.

TABLE IV

Water: Blend water.
Salinity: 4,030 p.p.m.
H₂S: None
Treatment time: 3 hours

| Chemical | Concentration (p.p.m.) | Total bacteria/ml. No sulfite | Total bacteria/ml. 30 p.p.m. sulfite | Dry media bottles[1] No sulfite | Dry media bottles[1] 30 p.p.m. sulfite | API anaerobic method[2] No sulfite | API anaerobic method[2] 30 p.p.m. sulfite |
|---|---|---|---|---|---|---|---|
| Aqualin | 10 | 80,000 | 80,000 | 3 | 2 | + | + |
| Do | 20 | 30,000 | 10,000 | 4 | 2 | --- | + |
| Do | 40 | 55 | 400 | X | 5 | – | + |
| Aqualin and Armour E-11[3] | 10 | 900 | 900 | X | 5 | – | – |
| Do | 20 | 100 | 150 | X | X | – | – |
| Do | 40 | 0 | 0 | X | X | – | – |
| Aqualin and Quat[3] | 10 | 2,200 | 2,200 | 4 | 3 | + | + |
| Do | 20 | 260 | 330 | X | X | – | – |
| Do | 40 | 0 | 0 | X | X | – | – |
| 1-chloro-2-propanone | 10 | 180,000 | 180,000 | 7 | 2 | + | + |
| Do | 20 | 160,000 | 160,000 | X | 2 | + | + |
| Do | 40 | 120,000 | 60,000 | X | 2 | + | + |
| 1-chloro-2-propanone and Armour E-11[3] | 10 | 170,000 | 175,000 | 10 | 3 | + | + |
| Do | 20 | 160,000 | 160,000 | X | 6 | + | + |
| Do | 40 | 120,000 | 125,000 | X | X | --- | + |
| 1-chloro-2-propanone and Quat[3] | 10 | 170,000 | 180,000 | 10 | 3 | + | + |
| Do | 20 | 155,000 | 40,000 | X | 4 | + | + |
| Do | 40 | 5,000 | 4,000 | X | X | – | --- |
| Armour E-11 | 10 | 185,000 | 180,000 | 3 | 2 | + | + |
| Do | 20 | 180,000 | 180,000 | 3 | 5 | + | – |
| Do | 40 | 165,000 | 180,000 | | X | --- | --- |

TABLE IV—Continued

| Chemical | Concentration (p.p.m.) | Total bacteria/ml. | | Dry media bottles [1] | | API anaerobic method [2] | |
|---|---|---|---|---|---|---|---|
| | | No sulfite | 30 p.p.m. sulfite | No sulfite | 30 p.p.m. sulfite | No sulfite | 30 p.p.m. sulfite |
| Quat [4] | 10 | 185,000 | 175,000 | 3 | 2 | + | + |
| Do | 20 | 180,000 | 175,000 | 3 | 3 | + | + |
| Do | 40 | 140,000 | 120,000 | 5 | X | + | − |
| Cinnamaldehyde | 10 | >200,000 | >200,000 | 2 | 2 | + | + |
| Do | 20 | >200,000 | >200,000 | 3 | 2 | + | + |
| Do | 40 | >200,000 | >200,000 | 3 | 2 | + | + |
| Cinnamaldehyde and Armour E-11 [3] | 10 | >200,000 | >200,000 | 3 | 3 | + | − − − |
| Do | 20 | 60,000 | 60,000 | 6 | 5 | − − − | − − − |
| Do | 40 | 95 | 25 | X | X | − − − | − − − |
| Cinnamaldehyde and Quat [3] | 10 | >200,000 | >200,000 | 3 | 2 | + | + |
| Do | 20 | 65,000 | 12,000 | 3 | 3 | + | − − − |
| Do | 40 | 240 | 24 | X | X | − − − | − − − |
| Mesityl oxide | 10 | >200,000 | >200,000 | 2 | 2 | + | + |
| Do | 20 | >200,000 | >200,000 | 3 | 2 | + | + |
| Do | 40 | >200,000 | >200,000 | 3 | 2 | + | + |
| Mesityl oxide and Armour E-11 [3] | 10 | >200,000 | >200,000 | 2 | 3 | + | + |
| Do | 20 | >200,000 | >200,000 | 4 | 5 | + | + |
| Do | 40 | 112,000 | 120,000 | 6 | X | + | − |
| Butyraldehyde | 10 | >200,000 | >200,000 | 2 | 2 | + | + |
| Do | 20 | >200,000 | >200,000 | 2 | 2 | + | + |
| Do | 40 | >200,000 | >200,000 | 3 | 2 | + | + |
| Butyraldehyde and Armour E-11 [3] | 10 | >200,000 | >200,000 | 3 | 3 | + | + |
| Do | 20 | >200,000 | 45,000 | 4 | 5 | + | − − − |
| Do | 40 | 165,000 | 45,000 | 6 | X | − − − | − − − |
| Furfural | 10 | >200,000 | >200,000 | 2 | 2 | + | + |
| Do | 20 | >200,000 | >200,000 | 2 | 2 | + | + |
| Do | 40 | >200,000 | >200,000 | 2 | 2 | + | + |
| Do | 40 | >200,000 | >200,000 | 3 | 2 | + | + |
| Furfural and Armour E-11 [3] | 10 | >200,000 | >200,000 | 3 | 2 | + | − − − |
| Do | 20 | 140,000 | 140,000 | 5 | 6 | + | − − − |
| Do | 40 | 130,000 | 70,000 | 6 | X | − − − | − − − |
| Cyclohexanone | 10 | >200,000 | >200,000 | 2 | 2 | + | + |
| Do | 20 | >200,000 | >200,000 | 2 | 2 | + | + |
| Do | 40 | >200,000 | >200,000 | 2 | 2 | + | + |
| Benzaldehyde | 10 | >200,000 | >200,000 | 2 | 2 | + | + |
| Do | 20 | >200,000 | >200,000 | 2 | 2 | + | + |
| Do | 40 | >200,000 | >200,000 | 2 | 2 | + | + |
| Acetophenone | 10 | >200,000 | >200,000 | 2 | 2 | + | + |
| Do | 20 | >200,000 | >200,000 | 2 | 2 | + | + |
| Do | 40 | >200,000 | >200,000 | 2 | 2 | + | + |
| Control (untreated water) | | 390,000 | 390,000 | 1 | 1 | + | + |
| Blank (media alone) | | 0 | 0 | | | − | − |

[1] Days required for blackening; "X" indicates no blackening at end of 30 days.
[2] "+" indicates growth and blackening; "− − −" indicates growth of light-colored colonies of Desulfovierio; "−" indicates no growth within 30 days.
[3] The concentrations shown represent a 50/50 ratio of each chemical.
[4] A 50% aqueous solution of alkyldimethylbenzylammonium chloride (alkyl group: 40% $C_{12}$, 50% $C_{14}$, 10% $C_{16}$).

TABLE V

Water: Blend water
Salinity: 3,600 p.p.m.
$H_2S$: None
Treatment time: 3 hours

| Chemical | Concentration (p.p.m.) | Total bacterial/ml. | | Dry media bottles [1] | |
|---|---|---|---|---|---|
| | | No sulfite | 30 p.p.m. sulfite | No sulfite | 30 p.p.m. sulfite |
| Aqualin | 10 | 95,000 | 180,000 | 4 | 1 |
| Do | 20 | 8,500 | 150,000 | 5 | 1 |
| Do | 40 | 650 | 25,000 | X | 2 |
| Aqualin and Armour E-11 [2] | 10 | 34,000 | 170,000 | 6 | 2 |
| Do | 20 | 1,300 | 40 | X | 4 |
| Do | 40 | 10 | 0 | X | X |
| 1-chloro-2-propanone | 10 | >200,000 | >200,000 | 5 | 1 |
| Do | 20 | >200,000 | >200,000 | 14 | 1 |
| Do | 40 | >200,000 | >200,000 | X | 2 |
| 1-chloro-2-propanone and Armour E-11 [2] | 10 | 200,000 | >200,000 | 6 | 2 |
| Do | 20 | 190,000 | 55,000 | X | 4 |
| Do | 40 | 190,000 | 200 | X | 7 |
| Crotonaldehyde | 10 | >200,000 | >200,000 | 3 | 1 |
| Do | 20 | >200,000 | >200,000 | 3 | 1 |
| Do | 20 | >200,000 | >200,000 | 5 | 1 |
| Crotonaldehyde and Armour E-11 [2] | 10 | 195,000 | 185,000 | 3 | 2 |
| Do | 20 | 175,000 | 250 | 5 | 3 |
| Do | 40 | 35,000 | 1 | 8 | X |
| 2-chloroacetophenone | 10 | >200,000 | >200,000 | 4 | 1 |
| Do | 20 | >200,000 | >200,000 | 4 | 1 |
| Do | 40 | >200,000 | >200,000 | 7 | 1 |
| 2-chloroacetophenone and Armour E-11 [2] | 10 | >200,000 | 110,000 | 4 | 2 |
| Do | 20 | 170,000 | 300 | 5 | 2 |
| Do | 40 | 110,000 | 25 | 7 | X |
| Glyoxal | 10 | >200,000 | >200,000 | 2 | 1 |
| Do | 20 | >200,000 | >200,000 | 2 | 1 |
| Do | 40 | >200,000 | >200,000 | 2 | 1 |
| Glyoxal and Armour E-11 [2] | 10 | 190,000 | 70,000 | 2 | 2 |
| Do | 20 | 120,000 | 1,700 | 5 | 2 |
| Do | 40 | 4,000 | 3 | 29 | X |
| Armour E-11 | 10 | 200,000 | 180,000 | 2 | 2 |
| Do | 20 | 185,000 | 800 | 4 | 3 |
| Do | 40 | 65,000 | 60 | 5 | X |
| Control (untreated water) | | 450,000 | 450,000 | 1 | 1 |
| Blank (media alone) | | 0 | 0 | | |

[1] Days Required for blackening: "X" indicates no blackening at end of 30 days.
[2] The concentrations shown represent a 50/50 ratio of each chemical.

What is claimed is:

1. A process for treating an aqueous liquid to be injected into a subterranean oil reservoir, which process comprises:
   dissolving in the aqueous liquid a water soluble sulfite salt in an amount sufficient to react with any oxygen in the aqueous liquid;
   dissolving in the resultant oxygen-scavenged aqueous liquid a mixture of at least one water soluble sulfite salt and quaternary ammonium salts comprising alkyldimethylbenzylammonium chlorides in which the alkyl group is composed of about 40% $C_{12}$, 50% $C_{14}$ and 10% $C_{16}$ alkyl groups;
   adjusting the proportions of sulfite salt to quaternary ammonium salt in said mixture to within about 20% of the stoichiometric proportions; and
   adjusting the amount of said mixture that is dissolved in the aqueous liquid to from about 10–40 parts per million.

2. The process of claim 1 in which said mixture of sulfite and quaternary ammonium salts is dissolved in an aqueous solution that is added to the aqueous liquid to be injected in increments alternating with increments, of the aqueous liquid to be injected, that are free of said mixture, with the concentration and frequency of said alternating increments being such that they mix within the reservoir to form an aqueous solution containing at least a bacterial-growth-inhibiting concentration of said mixture of sulfite and quaternary ammonium salts.

References Cited
UNITED STATES PATENTS

| | | | |
|---|---|---|---|
| 3,119,447 | 1/1964 | Raifsnider et al. | 166—275 |
| 3,329,610 | 7/1967 | Kreuz et al. | 252—8.55 |
| 3,625,888 | 12/1971 | Redmore | 252—8.55 |
| 2,867,279 | 1/1959 | Cocks | 252—8.55 |
| 2,692,231 | 10/1954 | Stayner et al. | 252—8.55 X |
| 3,033,784 | 5/1962 | Jones | 252—8.55 X |

HERBERT B. GUYNN, Primary Examiner

U.S. Cl. X.R.

166—274, 275; 424—175, 329